(12) United States Patent
Clabburn et al.

(10) Patent No.: US 6,525,877 B1
(45) Date of Patent: Feb. 25, 2003

(54) PROJECTION SCREENS AND THE LIKE (75) Inventors: Robin Clabburn, Sevenhampton (GB); Nicholas John Phillips, Loughborough (GB); Terence Edward Yeo, Newton Abbot (GB); Lee Batchelder, Derry, NH (US)

(73) Assignee: Nashua Corporation, Nashua, NH (US)

( * ) Notice: Subject to any disclaimer, the term of this patent is extended or adjusted under 35 U.S.C. 154(b) by 0 days.

(21) Appl. No.: 09/694,070

(22) Filed: Oct. 19, 2000

Related U.S. Application Data (63) Continuation-in-part of application No. 09/635,037, filed on Aug. 4, 2000, which is a division of application No. 09/307,376, filed on May 7, 1999, now abandoned, which is a continuation of application No. 08/731,212, filed on Oct. 10, 1996, now abandoned.

(30) Foreign Application Priority Data

Oct. 12, 1995 (GB) .............................................. 9520912

(51) Int. Cl.⁷ .......................... G03B 21/56; G03B 21/60
(52) U.S. Cl. ........................ 359/443; 359/454; 359/460
(58) Field of Search ................................ 359/443, 452, 359/453, 454, 455, 456, 622; 430/5

(56) References Cited

U.S. PATENT DOCUMENTS

| | | | |
|---|---|---|---|
| 4,721,361 A | 1/1988 | van de Ven | 350/128 |
| 4,755,921 A | 7/1988 | Nelson | 438/765 |
| 5,365,354 A | 11/1994 | Jannson et al. | 359/15 |
| 5,369,511 A | 11/1994 | Amos | 359/15 |
| 5,442,482 A | 8/1995 | Johnson | 359/619 |
| 5,648,874 A | 7/1997 | Sawaki et al. | 359/622 |
| 5,695,895 A | 12/1997 | Johnson et al. | 430/5 |
| 5,696,865 A | 12/1997 | Beeson et al. | 385/146 |
| 5,719,588 A | 2/1998 | Johnson | 345/8 |
| 5,837,346 A | 11/1998 | Langille et al. | 428/141 |

FOREIGN PATENT DOCUMENTS

| | | |
|---|---|---|
| EP | 0294122 | 12/1988 |
| WO | 9429768 | 12/1994 |

*Primary Examiner*—Christopher Mahoney
(74) *Attorney, Agent, or Firm*—Webb Ziesenheim Logsdon Orkin & Hanson, P.C.

(57) ABSTRACT

A light diffusing screen is made by exposing a photopolymerisable material to polymerising light through a mask having an array of light-transmitting apertures in an opaque background or vice versa, at least some of the light being directed obliquely onto the photopolymerisable material. The resulting photopolymerised material has asymmetric light diffusing properties. In some embodiments two beams of light directed onto the photopolymerisable material are equally and oppositely inclined to the perpendicular to the plane of the material. An analogous effect may be provided, in other embodiments, by exposing the photopolymerisable material to light converging conically on the photopolymerisable material.

5 Claims, 7 Drawing Sheets

PROJECTION SCREENS AND THE LIKE

RELATED APPLICATIONS

This application is a continuation-in-part of application Ser. No. 09/635,037, filed Aug. 4, 2000, which is a divisional of application Ser. No. 09/307,376, filed May 7, 1999, now abandoned which is a continuation of application Ser. No. 08/731,212, filed Oct. 10, 1996 now abandoned.

THIS INVENTION relates to a material suitable for use as a light diffusing screen or rear projection screen and to a material suitable for use as a front projection screen and for analogous purposes, such as in reflective signs, etc.

It is well known that the important parameters of projection screen materials include brightness, that is the amount of light, from the image source, reaching the viewer and the angles from the perpendicular to the surface of the material over which an acceptable brightness level (usually in excess of 50% of the maximum) is maintained.

In the following, reference is made to the "angle of view". In this specification, the term "angle of view" refers to the range of viewing angles of observers relative to a diffusing screen or a rear projection screen over which the apparent brightness of the screen is within 50% or more of the apparent brightness to an observer viewing the screen at right angles assuming that the light incident on the screen is incident along the normal to the screen. This figure is often referred to as "full width half maximum" or "fwhm". By way of example, the angle of view may be measured by illuminating a small area of the screen material by a laser beam (although some other collimated light beam may be used) directed normally (i.e. perpendicularly) to the plane of the screen and measuring the light diffused or reflected from that small area (according to whether a light diffusing screen such as a back projection screen or a reflective screen such as a front projection screen is involved), over a range of angles. Furthermore, in the following, the expression "angle of view for transmission" means "angle of view" defined as above for a screen of light-diffusing material illuminated by a projector or the like disposed on the opposite side of the plane of the screen from the observer, i.e. for a rear-projection screen, whilst the expression "angle of view for reflection" means "angle of view" defined as above for a screen of light reflective material illuminated by a projector or the like disposed on the same side of the plane of the screen as the observer, i.e. for a front projection screen.

Established methods for producing materials suitable for front projection screens and for analogous purposes include, on the one hand, the lamination of light diffusing films to specular or "mirror like" surfaces and, on the other hand, incorporating geometric features into such surfaces, for example corner cube arrays. Where a light diffusing material is laminated to a mirror-like surface, the angle of view for reflection is approximately double the angle of view for transmission for small to moderate angles of view. With a front projection screen produced by incorporating geometric features in a reflective surface the angle of view is determined by the geometry of such features. Where a light-diffusing material is laminated to a reflective surface, increases in angle of view to achieve appropriate reflective characteristics may be impossible or may be obtainable only to the detriment of some other important factor such as brightness (reduced if film thickness is increased), flexibility or cost. Where reflective diffusion is obtained by providing an array of geometric features, the angle of view can only be changed by changing the geometric features. The geometric features can only be changed by changing the mould, press tools or other tools used to produce these features, and this is expensive.

It is among the objects of the invention to provide an improved light diffusing material suitable for use as a back projection screen, to provide an improved material suitable for use as a front projection screen or in reflective signs or in analogous applications, and to provide improved methods of manufacturing such materials.

It is known to provide a diffusion or rear projection screen by a technique in which a layer of photopolymerisable material is exposed to a pattern of polymerising light comprising an array of spots of light (or, alternatively, an array of dark spots in a light field) to induce selective polymerisation of the material with consequent refractive index gradations throughout the material, resulting in a light dispersing or diffusing effect. Such selective photopolymerisation may be brought about, for example, by applying to one surface of a layer of photopolymerisable material supported on a substrate, an optical mask comprising an array of light-transmitting areas in an opaque surround (or alternatively, a mask comprising an array of opaque areas in a transparent surround). The technique may be substantially that disclosed in European Patent No. 0294122 in which the mask apertures are substantially circular, resulting in the production of an array of graded refractive index lenses in the photopolymerised layer. Alternatively, the mask apertures may be oval or ellipsoidal in shape, with their major axes extending parallel with one another, thereby producing an array of astigmatic graded refractive index lenses, as a result of which the photopolymer layer has asymmetric characteristics as regards angle of view. Techniques disclosed in co-pending International Patent Application No. PCT/GB94/01281 and in corresponding U.S. Pat. No. 5,695,895 allow the production of a mask in which the array of apertures in the mask conforms to a random "speckle" pattern, in which individual apertures are irregularly and randomly shaped.

In the techniques described above, the polymerising light is incident on the mask and underlying photopolymer layer substantially normally. However, the applicants have discovered that useful properties can be imparted to the resulting screen if, during exposure the light or other polymerising radiation is directed into the photopolymerisable material at an angle other than substantially normally, or if multiple sources of light or other polymerising radiation are used to create multiple beams, if at least some of these beams are inclined to the plane of the photopolymer layer. The applicants have also found that by adopting such expedients whilst at the same time ensuring that the exposure arrangement is symmetrical about a preferred axis, for example an axis normal to the layer of polymerisable material, symmetry of the resulting diffusion characteristics about such axis can be obtained. Such symmetry can also be obtained by rotation of the assembly including the layer of polymerisable material relative to the exposure means about such axis during exposure. According to one aspect of the invention there is provided a method of making a light-diffusing screen comprising providing a sheet of a light-transmitting radiation polymerisable (as herein defined) material of a type in which, after polymerisation, the refractive index varies with degree of polymerisation, exposing said material to a predetermined pattern of polymerising radiation comprising an array of spots of high intensity radiation in a background of lower or zero intensity radiation, or comprising an array of spots of lower or zero intensity radiation in a background of high intensity radiation, at least some of said radiation being directed along an axis which is inclined with respect to the plane of said sheet of material.

According to another aspect of the invention there is provided a light-diffusing sheet material having at least some graded refractive index features having axes or preferred orientations aligned along a direction having a component parallel with the plane of the material.

Preferably said graded refractive index features comprise a first set of graded refractive index lenses having their optical axes extending along a first direction which is inclined with respect to the plane of the screen and a second set of graded refractive index lenses having their optical axes extending along a second direction which is inclined with respect to the plane of the screen.

Whilst, in some embodiments of the invention, the polymerisable material used is such that polymerisation can be effected or initiated by exposure to light, and in particular to ultraviolet light, it will be appreciated that polymerisable material may be used which is such that polymerisation can be effected by other forms of radiation, for example by electron beams or ion beams. The term "radiation polymerisable" as used herein is intended to include such variants as well as materials polymerisable by ultraviolet light.

Preferably, during the exposure of said material, it is exposed at least principally to polymerising radiation from two directions which are equally and oppositely inclined with respect to a plane which is perpendicular to the plane of the sheet of material. However, in some embodiments of the invention, the material is exposed to radiation from a single direction inclined with respect to the plane of the material.

Diffusion or rear projection screens in accordance with some embodiments of the invention can be made to have a pronounced asymmetry. Further, by variation of such factors as the incident angles of the light used for exposure of the photopolymer, it is possible to tailor the degree of asymmetry as well as other parameters, such as "strength" of diffusion (e.g. fwhm).

Embodiments of the invention are described below with reference to the accompanying drawings, wherein.

Figure 1:
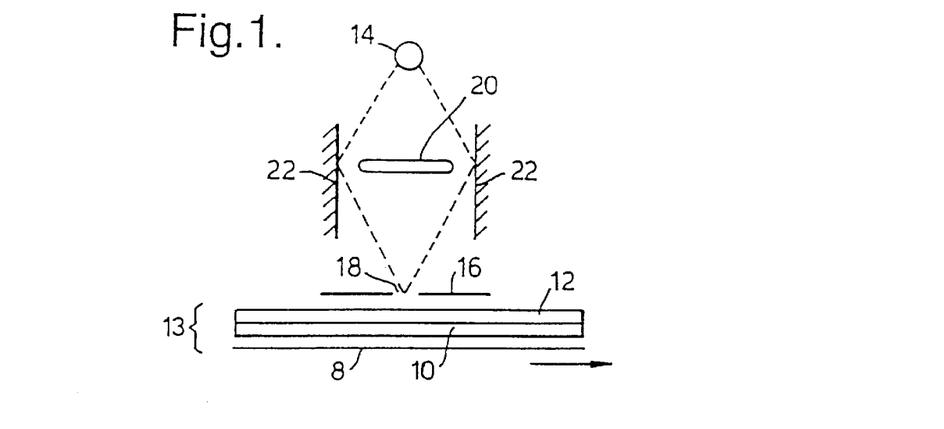
FIG. 1 is a diagrammatic side elevation drawing illustrating a first method of producing a diffusion screen in accordance with the present invention.

Referring FIG. 1, there is shown at 10 a layer of a transparent photopolymerisable medium supported by a flat transparent substrate 8. The medium forming layer 10 may be a photopolymerisable monomer of the kind referred to in E0294122 EP or may be that supplied by DuPont under the Registered Trade Mark OMNIDEX and having the type designation HRF 150 or HRF 600, discussed in more detail in, for example, W095/06887. Superimposed upon the photopolymerisable layer 10 is an optical mask 12 of any of the kinds referred to above with the apertured opaque layer on the mask being in contact with the layer 10. Means, (not shown), is provided for moving the substrate (8) /mask (12) /photopolymer (10) combination (herein referred to as combination 13) in its own plane in the direction indicated by the arrow, past exposure means comprising a source 14 of polymerising radiation, such as an ultraviolet strip lamp, disposed at some distance above the plane of the combination 13 and parallel therewith, the strip lamp extending perpendicular to the direction of the arrow.

Disposed directly above the combination 13 is an opaque screen 16 spaced slightly from the mask 12 and parallel therewith, the screen 16 having an aperture or slot 18 therein which is elongate in the same direction as the strip light source 14, the slot 18 being disposed directly below source 14 so that a notional plane including the axis of the strip source 14 and that of the slot 18 is perpendicular to the plane of combination 13. An opaque baffle 20 is disposed between the source 14 and slot 18 to prevent light from the source 14 from passing directly to the slot. On either side of the baffle 20 are arranged opposing mirrors 22, parallel with one another and with the axes of strip source 14 and slot 18 and perpendicular to the plane of the layer 10.

With this arrangement, the two mirrors reflect respective beams of light from the source 14 through the slot 18 and thus through the mask 12 and into the layer 10, the two beams being equally and oppositely inclined with respect to the plane, perpendicular to the plane of combination 13, passing through the slot 10 and source 14. During such exposure, the combination 13 is traversed steadily past the slot 18 to expose the entire area of the mask (and the polymerisable medium 10 beneath the light transmitting portions of the mask). The use of a slot 18 past which the combination 13 is traversed is necessary simply to ensure that all parts of the combination are exposed to light from the same angles or the same limited range of angles. It would, of course, be possible to dispense with the traversing of the combination 13 relative to the exposure means if parallel beams of sufficient width and intensity to encompass the whole of layer 10 at once were available, but this implies, for example, the availability of relatively expensive optics. It has been found, incidentally, that it is not necessary to have a single source 14. Corresponding results have been obtained by using two separate UV light sources (such as two parallel strip sources), arranged at equal and opposite angles with respect to the slot 18.

A diffusing screen produced by the method described above with respect to FIG. 1 has asymmetrical diffusion characteristics, and the extent of maximum spread of the diffused light increases with increased inclination of the beams passing through slot 18 to the normal to the plane of the photopolymer sheet 10.

It has been found that the asymmetrical diffusion effect noted is obtained even if only an initial part of the exposure of layer 10 through mask 12 is by mutually inclined light beams, with the remainder of the exposure being by radiation incident normally on the mask 12/layer 10 combination.

Figure 5:
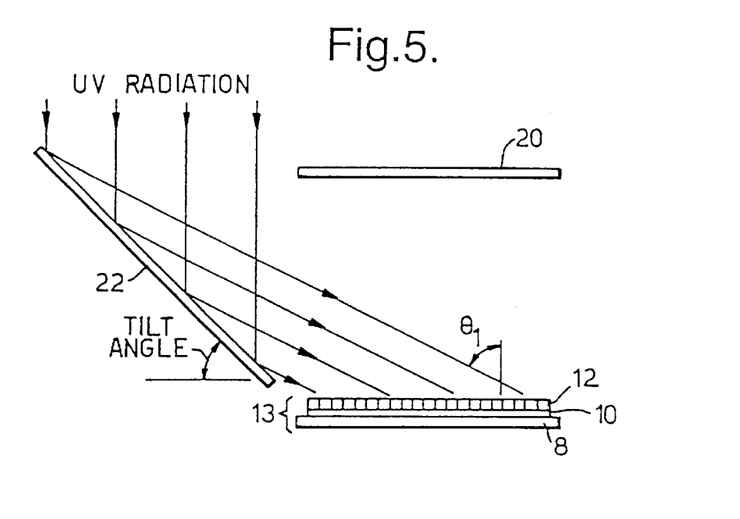
FIG. 5 is a view similar to FIG. 1 but illustrating a further method of producing a diffusion screen in accordance with the invention.

It will be appreciated that asymmetry of diffusion is not dependent upon strict equality of inclination of the beams used for exposure of the layer 10. Indeed, as discussed below, asymmetrical diffusion characteristics are also obtainable using an exposure regime such as shown in FIG. 5 in which only a single inclined beam is used.

Figure 2:
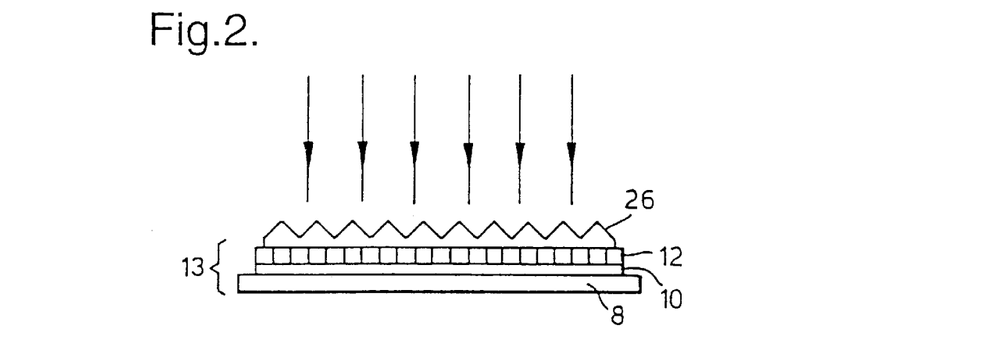
FIG. 2 is a diagrammatic side elevation drawing illustrating a second method of producing a diffusion screen in accordance with the present invention.
Figure 3:
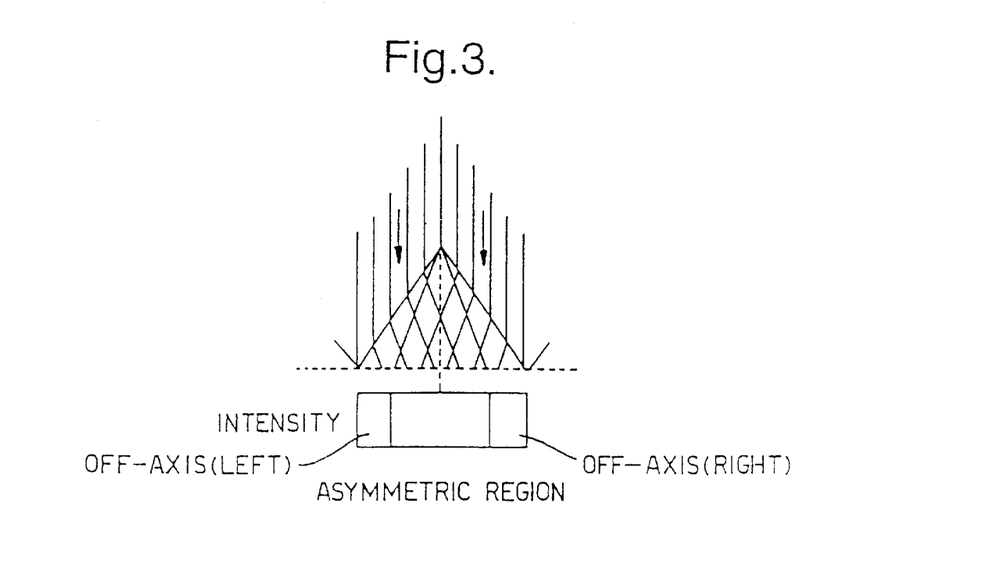
FIG. 3 is a diagrammatic view, corresponding to FIG. 2 but to a larger scale and illustrated by raytracing.

Referring to FIGS. 2 and 3, in another method of exposing the photopolymerisable layer 10 to light from two oppositely inclined directions, use is made of a transparent prismatic film or sheet 26 having a series of identical parallel roof-shaped ridges 28 forming one surface of the film or sheet 26 and having an opposing flat surface. Such a film is known, and is available from the 3M Company. Such a film is referred to as "brightness enhancing film" or "BEF", below.

In the following, referring to FIG. 2, in which like parts have like references, a sheet of the prismatic film or BEF referred to is placed directly on top of the mask 12, itself, of course, placed directly on the upper surface of the layer 10 of photopolymerisable material. The prismatic film 26 is placed with its flat surface lowermost in FIG. 2, engaging the mask 12. In this arrangement, the photopolymer 10 is exposed, through the film 26 and mask 12, by polymerising radiation incident on the assembly normally, (i.e. perpendicular to the plane of the layer 10, etc.), from a suitable UV light source (not shown). Unless a parallel beam of polymerising radiation of the width sufficient for exposure of the whole of the photopolymer layer 10 is available, it may, again, be necessary to expose the photopolymer through a slot disposed above the layer 10/mask 12/film 26 combination with that combination being traversed steadily beneath the slot during exposure, in much the same way as described with reference to FIG. 1.

The effect of the prismatic film is illustrated in more detail in FIG. 3 and is, as illustrated, to produce, below each prismatic ridge, a region in which the photopolymer is exposed to light from two directions inclined equally and oppositely with respect to the normal to the plane of the layer 10. As a result, each such region exhibits asymmetrical diffusion characteristics in much the same way as the product obtained by the method to which FIG. 1 relates. Because, as illustrated in FIG. 3, there are regions adjoining each trough in the prismatic film which receive light from only one (inclined) direction, these regions may not possess asymmetrical diffusion characteristics. If the pitch of the prismatic ribs (i.e. the distance between the ridge of one roof shaped rib and the ridge of the next) is small (see Table 1 below), there is no discernible variation in diffusion characteristics from one part of the resulting photopolymer diffusion screen to another, in normal use of the screen.

Figure 4:
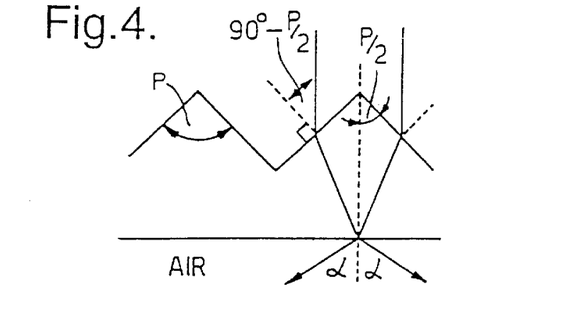
FIG. 4 shows a ray trace analysis for a prismatic film.

FIG. 4 shows a ray trace analysis for a generic prismatic film. The variables of note, assuming that the incident radiation is normal to the plane of the flat surface of the prismatic film, are the prism angle (p) and refractive index (n) of the medium. Analysis of the situation illustrated in FIG. 4 shows that the exit angle α, is given by:

$$\alpha = \sin^{-1}\left[n \cos\left(\frac{P}{2} - i\right)\right]$$

The refractive index of the photopolymerisable materials referred to above is relatively close to that of the currently preferred BEF film, namely polycarbonate, so that with the prismatic film in intimate contact with the layer 10 of photopolymerisable material, the refraction at the interface between the photopolymerisable material and the prismatic film is far less pronounced than that represented in FIG. 4.

The choice of exit angles provides one means of controlling the symmetry of the resulting product.

An example of the production of an asymmetric diffusing material by the method outlined above is set out below.

EXAMPLE 1

The photopolymerisable material used was black backed 90 μm DuPont HRF 600 material exposed to UV light, through a mask, through polycarbonate BEF film having a prism pitch of 31 microns, a prism angle of 100° and a refractive index of 1.586. The exposure was to UV2 ultra-violet light with an intensity of 4 mw per square centimetre for 15 minutes. After exposure, the polymerisable material was heated to 140° C. and maintained at that temperature for 5 minutes. The following table, Table 1, illustrates the results obtained. For comparison, a diffusion screen produced using the same photopolymerisable material and mask but with normally incident radiation (i.e. without the BEF film) was also tested and the results are also set out in Table 1 below for comparison (Microsharp standard). Table 1 below also sets out corresponding results for a product obtained by laminating two layers of the photopolymer diffusion screen produced by the method described above (with the direction of widest angle view being the same for both sheets in the laminate) (Double Microsharp BEF).

TABLE 1

| Sample | FWHM-x | FWHM-y | Asymmetry Factor | Screen Gain |
| --- | --- | --- | --- | --- |
| Microsharp - std | 45° | 45° | 1 | 1.75 |
| Microsharp - BEF | 35° | 13° | 2.7 | 6.75 |
| Double Microsharp BEF | 47° | 20° | 2.35 | 2.5 |

As noted from the Table above, a marked degree of asymmetry in diffusion is obtainable.

As shown in Table 1 above, the screen gain (i. e. the ratio of the maximum brightness of the screen (when back-illuminated by a uniform parallel beam), as viewed at the appropriate angle, to the average brightness of the screen over all viewing angles, was also increased.

Referring to FIG. 5, this shows a further variant method in which the mask/polymerisable material/substrate combination 13 is illuminated by a single beam directed at an angle θ₁ relative to the normal to the plane of the mask/polymerisable material/substrate combination. The beam may simply be a slightly divergent beam coming from, e.g. an ultraviolet source, the mask/polymerisable material/substrate combination being shielded from direct radiation from the source by a baffle, as in the embodiment of FIG. 1, and as in the arrangement of FIG. 1 may be exposed through a slot in an opaque screen whilst the combination 13 is traversed past this slot. However, as illustrated in FIG. 2, the mask/polymerisable material/substrate combination may be exposed by a collimated, i.e. substantially parallel beam, initially directed normal to the plane of the polymerisable material and reflected by an inclined mirror onto the mask/polymerisable material/substrate combination at the angle $\theta_1$ relative to the normal, the baffle again serving to intercept direct radiation not reflected from the mirror.

It will be appreciated, of course that it is equally possible to utilise a collimated light source directed onto the mask/polymerisable material/substrate combination without any intervening mirrors or baffles.

Figure 6:
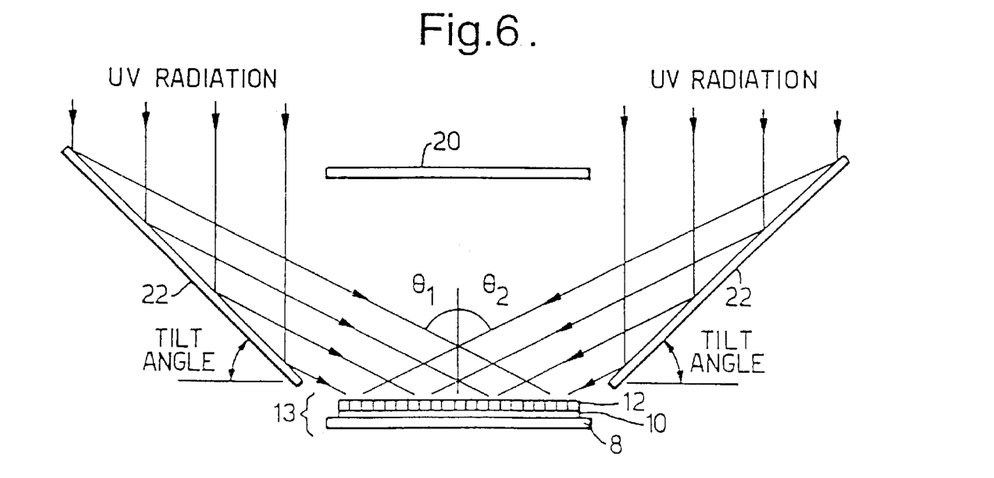
FIG. 6 is a view similar to FIGS. 1 and 5 but illustrating a yet further method of producing a diffusion screen in accordance with the invention.

FIG. 6 illustrates a variant of the method of claim 1, in effect, where a substantially parallel, collimated beam is directed, initially normally to the plane of the mask/polymerisable material/substrate combination 13, to be reflected by two inclined plane mirrors on either side of the material to strike the combination 13 at angles of $\theta_1$ and $\theta_2$ respectively to the normal to said plane. A baffle 20 is again provided to intercept direct light not reflected from the mirrors. Again, it will be understood that the light beams striking the material at the angles $\theta_1$ and $\theta_2$ could alternatively come directly from respective collimated light sources arranged at the appropriate angles, without the need for respective mirrors or baffles.

Figure 7:
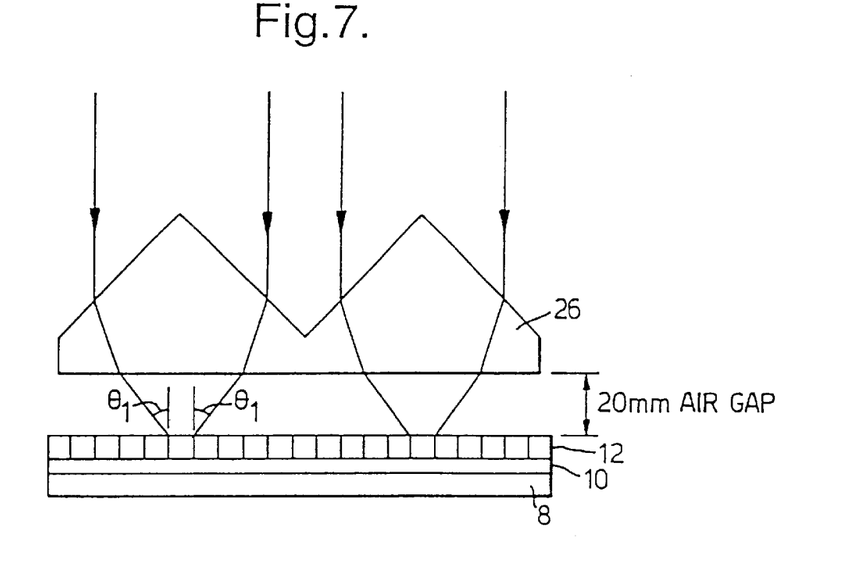
FIG. 7 is a view similar to FIG. 2 but illustrating a still further method of producing a diffusion screen in accordance with the invention.

FIG. 7 illustrates a variant of the method of FIG. 2 in which, instead of the BEF being in contact with the mask 12, it is spaced thereabove by a gap (of 20 mm in the example illustrated).

Tables 2 and 3 below relate to a further set of examples, in which the exposure regime was as illustrated in FIG. 5 (for examples #1 to #3); FIG. 6 (for examples #4 and #5) and FIG. 7 (for examples #6 and #7).

In these examples, the photopolymerisable material (90 micron thick, clear backed DuPont HRF600 photopolymer) was exposed successively to ultraviolet light as the polymerising radiation, the light being collimated to afford a uniform parallel beam. The respective exposure energies in the UV1, UV2 and UV3 bands of the ultraviolet spectrum were as indicated in the columns headed UV1, UV2 and UV3 in Table 2 below. After exposure, the material was oven cured for 20 minutes at 100° C. The columns headed $\theta_1$ and $\theta_2$ in Table 2 indicate the values of $\theta_1$ (and $\theta_2$ where applicable) in the exposure arrangements illustrated in FIGS. 5 and 6.

Table 3 below sets out the light diffusing properties of the resulting products. The light diffusing properties of the material were investigated using a collimated parallel beam of light directed onto the respective material along an axis and measuring the light intensity of the light, from said beam, directed by the material at different angles relative to said axis, such measurement being effected by a known instrument called a goniometer. For some of these measurements, the angle of the plane of the material relative to said axis was varied, and the angles referred to in the column headed "Comments" in Table 3 are the angles, for these measurements, of the normal to the plane of the material to said axis. The control sample (#1) possessed a diffusion pattern exhibiting rotational symmetry about an axis normal to the plane of the material. The off-axis sample (#2) possessed a similar diffusion pattern when illuminated off-axis at an incident angle approximately equal to the recording angle of incidence, such that the incident beam from the light source was aligned along the direction, relative to the material, of the beam of light used during exposure. The samples produced by the twin mirror (#4 and #5) and BEF approaches (#6 and #7) using identical processing conditions possessed very similar performance characteristics. As with the off axis sample (#2), when these samples were illuminated at an incident angle approximately equal to either recording angle of incidence, such that the incident beam from the light source was aligned along the direction, relative to the material of the beam of light used during exposure, a rotationally symmetrical diffusion pattern was observed, i.e. possessing rotational symmetry about the axis of the beam incident upon the material in the measuring set-up.

In Table 3, the columns headed "FWHM(O) x, y" relate to measurements made with the material perpendicular to the axis of the incident beam, with the plane in which the goniometer measurements were made being parallel with (y) and perpendicular to (x) the plane in which the angles $\theta_1$ and $\theta_2$ are measured in the regimes of FIGS. 5, 6 and 7 and the corresponding plane in the regime of FIGS. 3 and 4).

As will be noted, the materials of Examples #2 to #7 possessed marked asymmetry in diffusion characteristics between the "x" and "y" measurements, this being quantified in the column headed "Asy'". Thus, the asymmetric samples produced by the two mirror (#3) and BEF approaches (#6 and #7) using identical processing conditions possessed very similar performance characteristics. When illuminated by collimated light normal to their input face they possessed an approximately 2:1 elliptical profile.

The last column sets out the screen gain for each of these examples.

TABLE 2

Summary of processing conditions

| # | Description | Inc' $\theta_1$ | Inc' $\theta_2$ | UV1 mJ/cm² | UV2 mJ/cm² | UV3 mJ/cm² | Oven Cure |
|---|---|---|---|---|---|---|---|
| 1 | Control | 0° | 0° | 23.8 | 122.4 | 34.0 | 100° C. for 20 mins |
| 2 | Off-axis, mirrors tilted 15° | 30° | n/a | 15.9 | 81.0 | 22.4 | 100° C. for 20 mins |
| 3 | Off-axis, mirrors tilted 5° | 10° | n/a | 15.9 | 81.0 | 22.4 | 100° C. for 20 mins |
| 4 | Asymmetry through twin mirrors tilted at 15° | 30° | 30° | 31.5 | 162.0 | 44.8 | 100° C. for 20 mins |
| 5 | Asymmetry through twin mirrors tilted at 5° | 10° | 10° | 31.5 | 162.0 | 44.8 | 100° C. for 20 mins |
| 6 | Asymmetry through BEF on mask | 30° | 30° | 23.8 | 100.8 | 34.0 | 100° C. for 20 mins |
| 7 | Asymmetry through BEF at 20 mm above mask | 30° | 30° | 23.8 | 100.8 | 34.0 | 100° C. for 20 mins |

TABLE 3

Summary of processing conditions, FWHM(0) refers the value at normal incidence.

| | | | FWHM (0) | | | |
|---|---|---|---|---|---|---|
| # | Description | Comments | x | y | Asy' | Gain |
| 1 | Control | Standard symmetrical diffuser | 45° | 45° | 1 | 3.2 |

TABLE 3-continued

Summary of processing conditions,
FWHM(0) refers the value at normal incidence.

| # | Description | Comments | FWHM (0) x | y | Asy' | Gain |
|---|---|---|---|---|---|---|
| 2 | Off-axis, mirrors tilted 15° | Maximum diffusion occurs at 30° | 20° | 6° | 3.3 | 30 |
| 3 | Off-axis, mirrors tilted 5° | Maximum diffusion occurs at 10° | 36° | 20° | 1.8 | 5.8 |
| 4 | Asymmetry through twin mirrors tilted at 15° | Maximum diffusion occurs at ±30° | 33° | 14° | 2.4 | 5.9 |
| 5 | Asymmetry through twin mirrors tilted at 5° | Maximum diffusion occurs at ±10° | 42° | 38° | 1.1 | 3.5 |
| 6 | Asymmetry through BEF on mask | Maximum diffusion occurs at ±30° | 30° | 11° | 2.7 | 12.4 |
| 7 | Asymmetry through BEF at 20 mm above mask | Maximum diffusion occurs at ±10° | 32° | 12° | 2.7 | 10 |

Example #7 illustrates that it is not necessary to have the BEF in intimate contact with the contact mask making the regime compatible with a continuous process.

Examples #3 and #5 also indicate how, by carefully tailoring the recording geometry, varying degrees of off-axis or asymmetric performance can be encoded. For example, a reduction in the mirror tilt angle will result in a reduction in the degree of asymmetry and potential off-axis performance.

Figure 8:
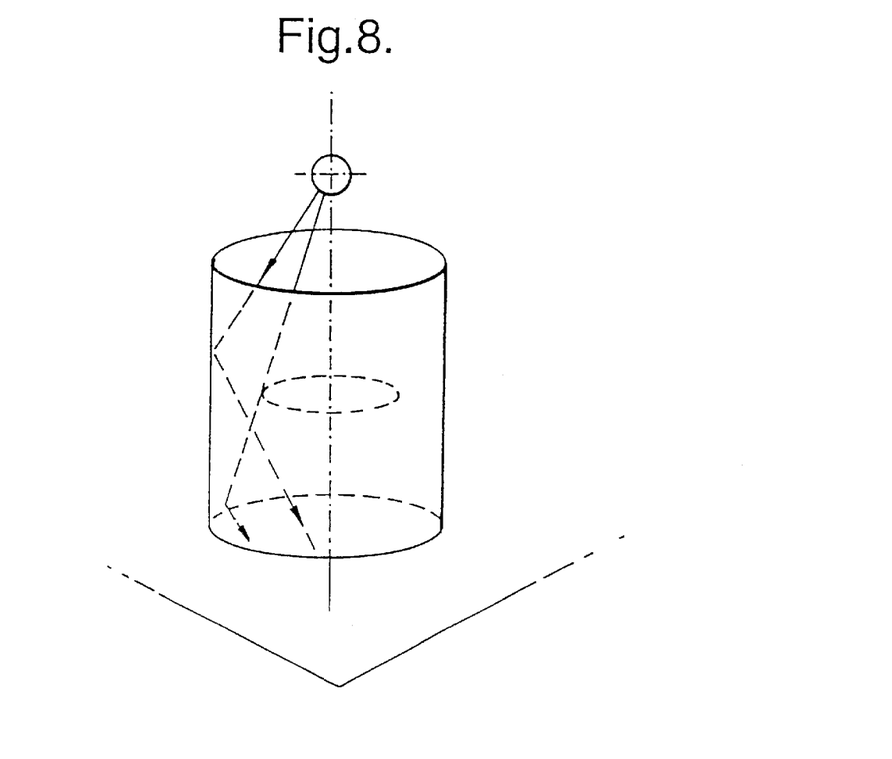
FIG. 8 is a diagrammatic perspective view illustrating a still further method of producing a diffusion screen in accordance with the invention.

Referring to FIG. 8, a yet further exposure method is illustrated which is similar in some respects to the arrangement of FIG. 1, except that the two opposing plane mirrors are replaced by a cylindrical mirror, that is to say by a mirror in the form of an open-ended hollow cylinder providing an internal reflective surface, the mirror being arranged above the mask/polymerisable material/substrate combination with its longitudinal axis normal to the plane of that combination, a point light source (or pseudo point light source such as a round bulb) being disposed above the upper end of the cylinder on said axis. A centrally located circular baffle is mounted with the cylinder. As a result of the circular symmetry of the arrangement about the cylinder axis, the mask/polymerisable material/substrate combination is subjected to radiation from, in effect, an extended annular light source centred on the axis of the cylinder. It will be understood that the cylindrical mirror/point light source arrangement may in fact be replaced by a real extended annular light source. A similar effect may be provided by, for example, providing a single collimated beam striking the mask/polymerisable material/substrate combination at a desired angle to the normal and rotating the combination in its own plane at a speed sufficient to ensure that the period of one revolution is small in relation to the curing time or the polymerisation initiation time of the material.

As a further variation (not illustrated) of the method of FIG. 1, and by analogy with FIG. 6, the combination 13 may be exposed using a collimated parallel beam of polymerising radiation directed initially normally towards the combination but reflected onto the combination 13 by a hollow frusto-conical mirror.

Whilst in the examples described with reference to FIGS. 1 to 4 and 6 to 8, the exposure arrangement is symmetrical about an axis or plane perpendicular to the plane of the polymerisable material, for some applications, for example where, in use, the diffusing material will be illuminated obliquely, the exposure arrangement may be centred on an axis or plane which is inclined to the plane of the polymerisable material. Thus, for example, in an arrangement similar to that of FIG. 6, the mirrors may not be equally inclined so that consequently the angles $\theta_1$ and $\theta_2$ may be different. Likewise, in an arrangement similar to that of FIG. 8, the axis of the cylindrical mirror may be inclined relative to the plane of the photo-polymerisable material, or the light source may be offset laterally from the axes of the cylinder.

Similarly, in arrangements using prismatic film, such as those illustrated in FIGS. 2 to 4 and 7, the light may be incident obliquely on the prismatic film/mask/polymerisable material sandwich so as to be inclined at different angles to the two faces of each prism. Alternatively, or additionally, the individual prisms of the prismatic film may be asymmetrical, for example of saw-tooth form.

Figures 9, 10:
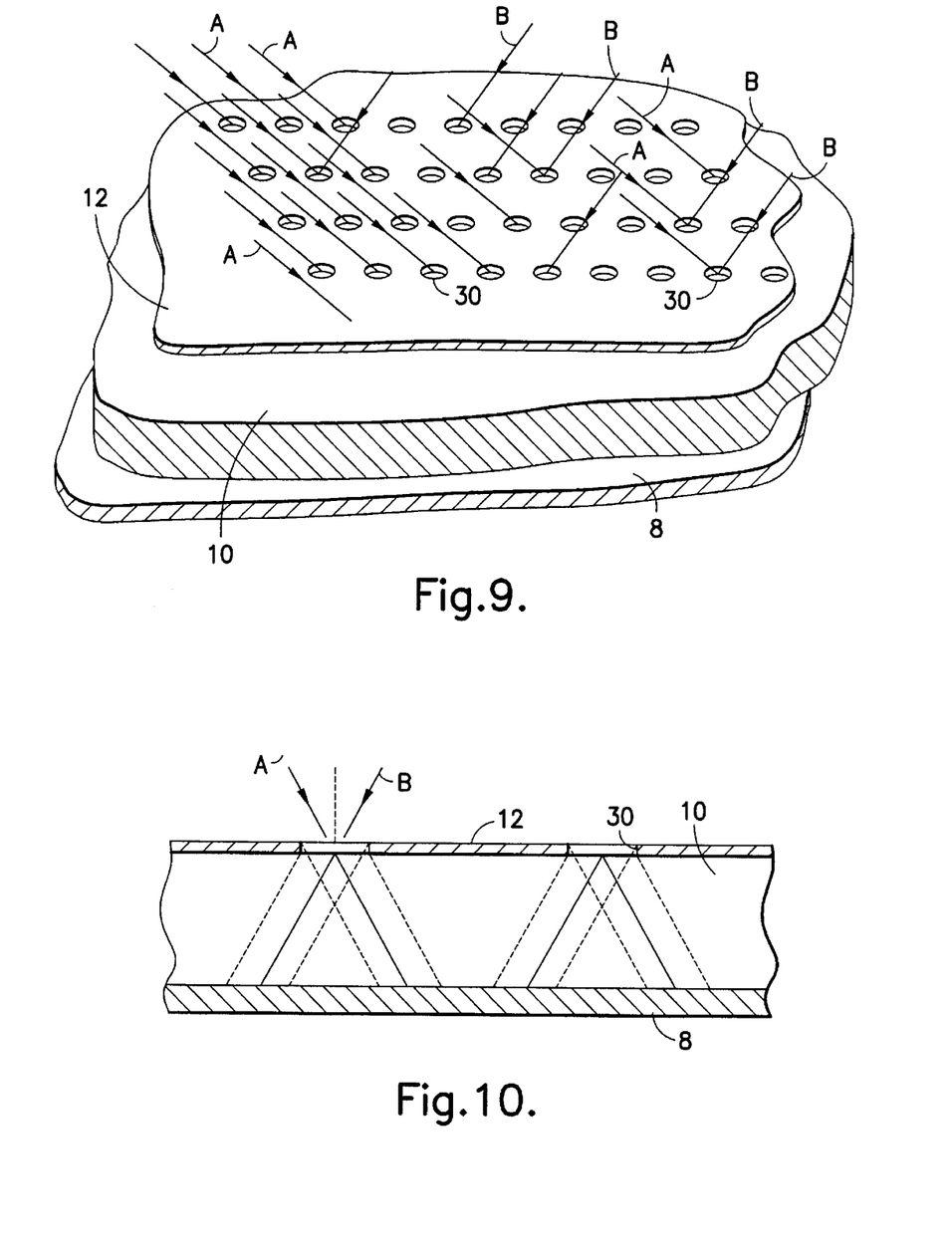
FIG. 9 is a diagrammatic fragmentary perspective view illustrating, to an enlarged scale, the exposure regime to which a photopolymerisable layer is subjected in a method of making a light-diffusing product in accordance with the invention.
FIG. 10 is a diagrammatic view in vertical section, to a still larger scale than FIG. 9, illustrating a light diffuser in accordance with the invention in the course of manufacture.
Figure 12:
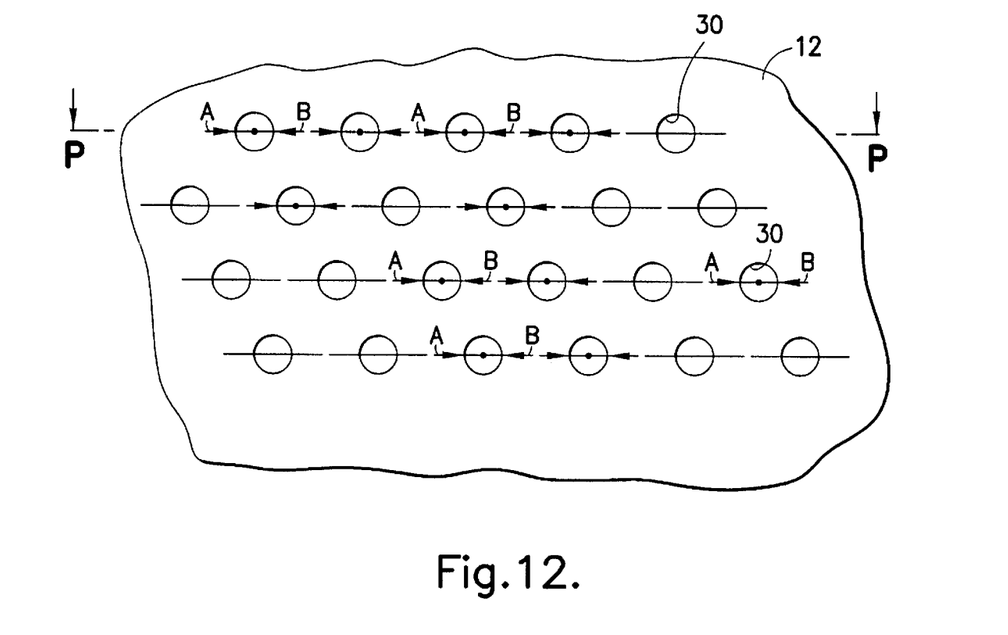
FIG. 12 is a plan view corresponding to FIG. 9.

FIG. 9 is a diagrammatic fragmentary perspective view illustrating, to an enlarged scale, the photopolymer exposure regime to which the photopolymerisable material is subjected in, for example, the methods illustrated in FIGS. 1 to 4 and 6. Referring to FIG. 9, this shows the layer 10 of photopolymerisable material having superimposed thereon the optical mask 12, the light-transmitting areas or apertures in which are indicated at 30. For simplicity, and to assist understanding, in the case illustrated in FIG. 9, the apertures 30 are circular apertures of uniform size, arranged in a regular array across the extent of the mask 12. It will be understood that in the exposure regimes of FIGS. 1 to 4 and 6, as noted above, the mask 12, superimposed on the photopolymerisable layer 10, is exposed to two intersecting beams of light, the first such beam being a parallel beam directed along an axis which is parallel with individual axes A illustrated in FIG. 9, (each such individual axis A, as explained below, passing through a respective mask aperture 30), and the second beam being a parallel beam directed along an axis parallel with individual axes B illustrated in FIG. 9 (each axis B likewise extending through a respective aperture 30). Thus, the second beam of photopolymerising light, intersects the first beam. Preferably, as illustrated, the axes A and B are oppositely and equally inclined with respect to the normal (perpendicular) to the plane of the mask, e.g. at angle θ to such perpendicular, as illustrated in FIG. 10. In FIG. 10, the inclined broken lines indicate the (approximate) limits of the graded refractive lenses (referenced 32). Ideally, as illustrated in FIG. 12, each axis A lies in the same vertical plane, perpendicular to the plane of the mask, as the corresponding axis B through the same lens aperture 30. Such a vertical plane is indicated at P—P in FIG. 12, (in which of course, plane P—P is perpendicular to the plane of the drawing). It will be understood that each aperture 30 may be typically of the order of 10 microns, possibly 5 microns or less) across with the spacing or pitch between adjacent apertures 30 being perhaps of the same order. Each light beam, on the other hand will typically extend over a width of at least several millimetres and will thus illuminate a great many apertures 30 simultaneously.

Figure 11A:
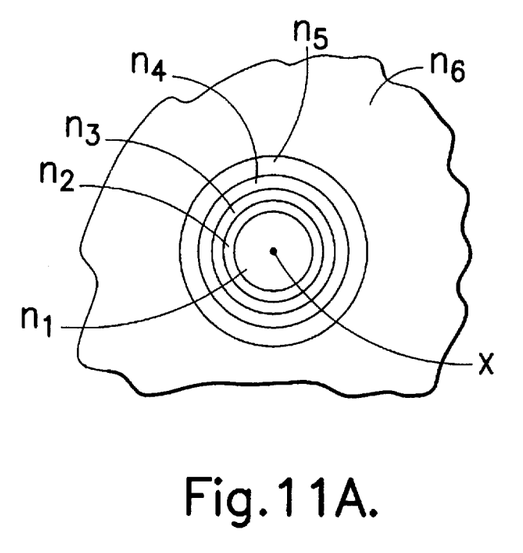
FIGS. 11A and 11B are respectively a schematic plan view and a schematic axial section view of stepped-variation refractive index lens analogous to a graded refractive index of the kind incorporated in embodiments of the invention.
Figure 11B:
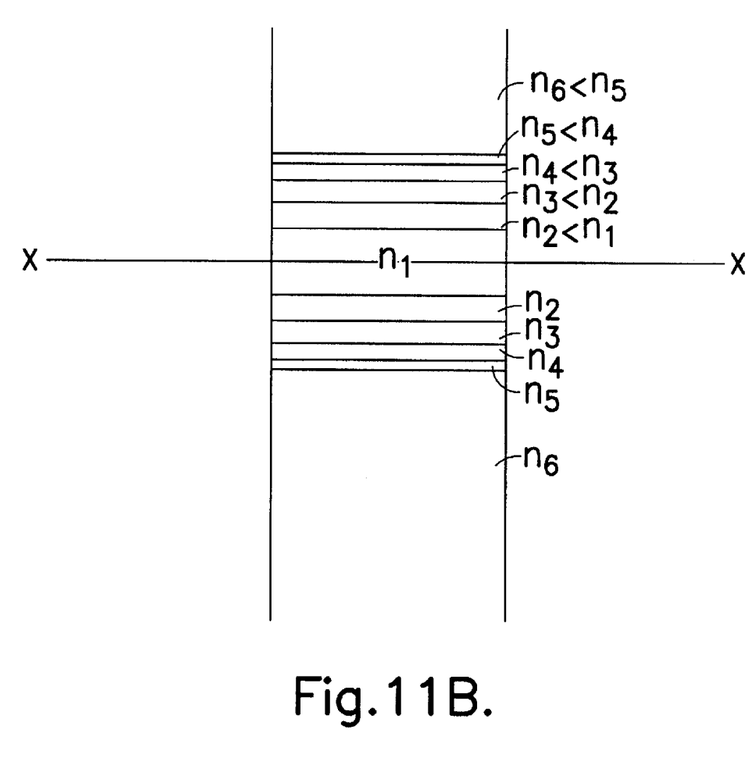
Figure 13:
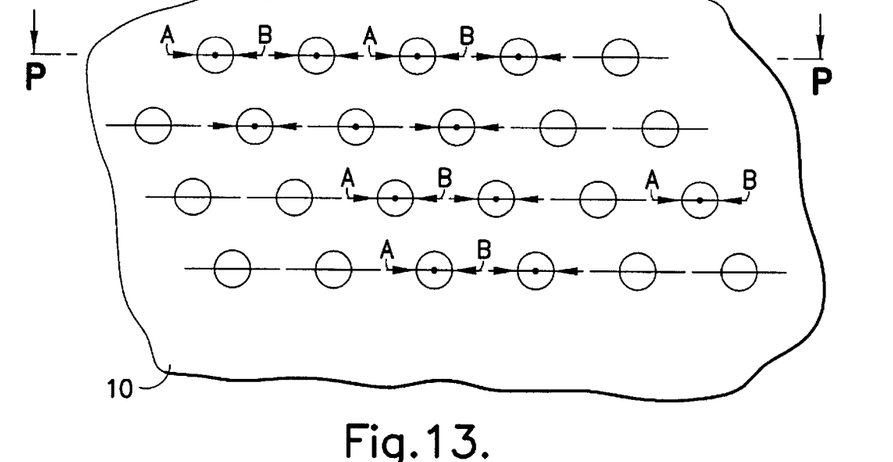
FIG. 13 is a fragmentary plan view corresponding to FIG. 12, of a diffusing screen in accordance with the invention.

If the combination of mask 12 and photopolymerisable material 10 were exposed to only one of the two beams A or B referred to, i.e. in the exposure regime as illustrated in FIG. 5, or if that combination were exposed to light directed along the normal (i.e. perpendicular) to the plane of the mask 12 or of the layer 10, the effect would be to produce, for each aperture 30, a respective single graded refractive index lens, i.e. a lens which, as described in EP-A-0294122 and as illustrated in FIG. 13 herein, is produced by variations in refractive index in the photopolymer such that, for example, throughout the thickness of the layer 10, the refractive index of the material at any point in the vicinity of a normal axis X—X through the centre of the aperture 30 decreases with increasing distance of the point from such axis but, for any such radial distance, is constant throughout the thickness of the material. Thus, such a graded refractive index lens may be thought of as being similar in effect, to a series of nested coaxial cylindrical tubes, each of a higher refractive index than the tube immediately outside and of a lower refractive index than the tube immediately on the inside. A lens comprising such a series of nested coaxial tubes is illustrated in FIGS. 11A and 11B where $n_1$ to $n_5$ are the successively lesser refractive indices of the axial cylinder and successive nested cylindrical tubular layers at successively greater distances from axis x and $n_6$ is the refractive index of the medium in which these nested tubes are disposed, and where $n_1 > n_2$; $n_2 > n_3$; $n_3 > n_4$; $n_4 > n_5$ and $n_5 > n_6$. It will be appreciated however that in a screen as described in EP-A-0294122, as in the screen of the present invention, the refractive index variation is continuous, i.e. graded, rather than stepwise and there is no sharp boundary to the lens and no sharply defined transition from one tube or shell to the next. However, in the exposure regime illustrated in FIGS. 9 to 14 in which two mutually inclined beams pass through each aperture 30, the result is, in effect, for each aperture 30, as illustrated in FIG. 10, a respective bifurcated or inverted V-shaped structure (defined by refractive index gradations) effectively comprising two mutually inclined graded refractive index lenses, (i.e. two graded refractive index lenses with mutually inclined optical axes A and B) which merge in the region immediately below the aperture 30, the refractive index in the merging region, at any point, being a function of the irradiation due to both beams at that point. However, bearing in mind that the refractive index deviation from that of unexposed areas takes place throughout the entire length of a graded refractive index lens of this type, the departure from the normal lens action in the region of such merging is at most a second order-effect.

Figure 14:
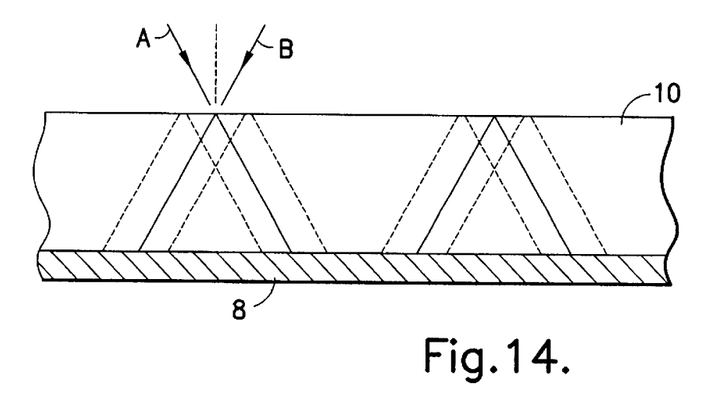
FIG. 14 is a fragmentary vertical section view, corresponding to FIG. 10 through a diffusing screen in accordance with the invention.
Figure 15:
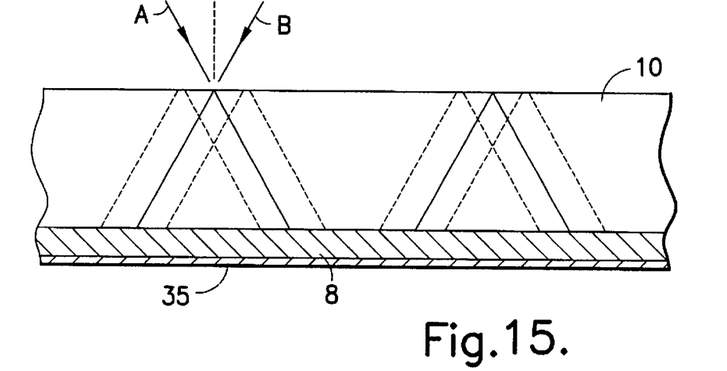
FIG. 15 is a view corresponding to FIG. 14 of a reflective diffusing screen in accordance with the invention.

FIGS. 13 and 14 illustrate the diffusion screen after stripping off the mask 12. The substrate 8, which is typically a transparent sheet material, such as a Mylar (R. T. M.) (polyester) film, may be retained. In FIGS. 13 to 15 corresponding references indicate the same parts and features as in FIGS. 9 and 10.

As illustrated in FIG. 15, a reflective diffuser, usable, for example, as a front projection screen, may be formed by applying a reflective metallisation layer 35 to the product illustrated in FIG. 14, either to the free surface of the substrate 8 (as illustrated) or to the exposed surface of the photopolymer. In either case, in use, light is directed onto the non-reflective side of the diffuser, to pass through the photopolymer and be reflected, by the layer 35, back through the photopolymer, to exit after diffusion in each pass through the photopolymer.

As indicated above, it is preferred, in most applications, that the light diffusing material should be uniform as to its light diffusing properties over the whole area of the material and this may be achieved by using, for exposure, collimated parallel beams of light or other polymerising radiation which are of sufficient width and which are sufficiently uniform across their width, where the material is exposed through a contact mask. Alternatively, the material may be traversed past a slot, as in FIG. 1, during exposure, to secure uniformity over an extended length of the material. However, as also indicated above, for some applications lack of uniformity across the area of the material may not present any disadvantage and, indeed, may be deliberately induced to secure a particular effect. It is contemplated, for example, that it may be possible, by using polymerising radiation striking the material at different angles in different zones, to produce diffusion screens which also operate to some degree as lenses or prisms, perhaps using a stepped variation in exposure angle to provide structures analogous to Fresnel lenses or prisms.

Whilst, in the examples illustrated with reference to the drawings, selective exposure of the polymerisable material to polymerising radiation is obtained by "contact printing", i.e. by exposure through an aperture mask in contact with the material, it will be understood that such selective exposure may also be obtained in other ways, for example by an image projection arrangement, by an intermittently energised scanned beam, or even holographically using coherent light.

It will be understood that whereas, for most applications, collimated (parallel) beams are preferred for exposure, diverging or converging beams may be used in some instances. Likewise, mirrors may be used which are convex or concave, rather than plane, depending upon the effects desired.

What is claimed is:

1. A light-diffusing product, comprising a sheet of light-transmitting material having a plane of major extension, said material incorporating an array of graded refractive index lenses, such that, over all of said sheet, the optical axes of said lenses are inclined with respect to said plane of the sheet and are parallel with one another and equally inclined to said plane.

2. A light-diffusing product according to claim 1 wherein said sheet comprises a photopolymer.

3. A light-diffusing product comprising a sheet of light-transmitting material having a plane of major extension, said material incorporating an array of graded refractive index lenses comprising a first set of graded refractive index lenses distributed over all of said sheet and having their optical axes parallel with one another and inclined at a first angle with respect to said plane of the sheet, and a second set of graded refractive index lenses distributed over all of said sheet, and interspersed with the graded refractive index lenses of the first sheet, the lenses of said second set having their optical axes parallel with one another and inclined at a second angle with respect to said plane of the said sheet, but non-parallel with the optical axes of the lenses of said first set.

4. A light-diffusing product according to claim 3 wherein the optical axes of the lenses of the first and second sets are parallel with a common plane perpendicular to the plane of said sheet and are oppositely inclined to the plane of said sheet.

5. A light-diffusing product according to claim 3 wherein said sheet material comprises a photopolymer.

* * * * *

UNITED STATES PATENT AND TRADEMARK OFFICE
CERTIFICATE OF CORRECTION

PATENT NO. : 6,525,877 B1 Page 1 of 1
DATED : February 25, 2003
INVENTOR(S) : Robin Clabburn et al.

It is certified that error appears in the above-identified patent and that said Letters Patent is hereby corrected as shown below:

Column 4,
Line 13, "Referring FIG." should read -- Referring to FIG. --.

Column 7,
Line 20, "$\theta_2$could" should read -- $\theta_2$, could --.

Signed and Sealed this

Seventeenth Day of June, 2003

JAMES E. ROGAN
*Director of the United States Patent and Trademark Office*